United States Patent [19]
Kim

[11] Patent Number: 5,933,103
[45] Date of Patent: Aug. 3, 1999

[54] RLL CODE GENERATION METHOD FOR DATA STORAGE DEVICE AND RECODING METHOD THEREFOR

[75] Inventor: Jin-sook Kim, Yongin, Rep. of Korea

[73] Assignee: Samsung Electronics Co., Ltd., Suwon-City, Rep. of Korea

[21] Appl. No.: 08/962,316

[22] Filed: Oct. 31, 1997

[30] Foreign Application Priority Data

Oct. 31, 1996 [KR] Rep. of Korea ............... 96-51854

[51] Int. Cl.[6] ............................................. H03M 7/00
[52] U.S. Cl. ............................................. 341/59; 341/94
[58] Field of Search .............................. 341/59, 94, 106

[56] References Cited

U.S. PATENT DOCUMENTS

| | | | |
|---|---|---|---|
| 4,644,564 | 2/1987 | Dolivo et al. | 375/18 |
| 4,707,681 | 11/1987 | Eggenberger et al. | 340/347 |
| 5,241,309 | 8/1993 | Cideciyan et al. | 341/59 |
| 5,243,605 | 9/1993 | Lekmine et al. | 371/43 |
| 5,635,933 | 6/1997 | Fitzpatrick et al. | 341/58 |
| 5,757,822 | 5/1998 | Fisher et al. | 371/37.1 |
| 5,784,010 | 7/1998 | Coker et al. | 341/61 |
| 5,822,143 | 10/1998 | Cloke et al. | 360/65 |
| 5,844,507 | 12/1998 | Zook | 341/50 |

*Primary Examiner*—Marc S. Hoff
*Attorney, Agent, or Firm*—Foley & Lardner

[57] ABSTRACT

A run length limited (RLL) code generation method for a data storage device is provided. In the RLL code generation method for generating a predetermined number of bit codewords, sequences of 16-bit data are received, and then sequences of 17-bit codewords are produced, wherein the sequences of 17-bit codewords has a first predetermined number of successive zeros as a maximum run length of zeros, and the sequences of 17-bit codewords include two subsequences each having a second predetermined number of successive zeros as a maximum run length of zeros. Thus, the RLL code generation method is helpful for an equalizer and provides a high recording density as well as a higher signal transmission rate compared to a rate 8/9(0,4/4) coding method.

5 Claims, 7 Drawing Sheets

| | | | | | |
|---|---|---|---|---|---|
| 1fe12 | 1fa13 | 1f6c3 | 1dea3 | 17e8d | 1f8a4 |
| 1fe13 | 1fa16 | 1f6c6 | 1dea4 | 17e8e | 1f8a5 |
| 1fe16 | 1fa19 | 1f6c9 | 1dea5 | 17e92 | 1f8a6 |
| 1fe19 | 1fa1a | 1f6cc | 1dea6 | 17e93 | 1f8a9 |
| 1fe1a | 1fa1c | 1f6d2 | 1dea9 | 17e96 | 1f8ac |
| 1fe1c | 1fa21 | 1f6e1 | 1deac | 17e99 | 1f8b1 |
| 1fe21 | 1fa23 | 1f6e4 | 1deb1 | 17e9a | 1f8b2 |
| 1fe23 | 1fa24 | 1f6ff | 1deb2 | 17e9c | 1f8b4 |
| 1fe24 | 1fa25 | 1ee12 | 1deb4 | 17ea1 | 1f8c3 |
| 1fe25 | 1fa26 | 1ee13 | 1dec3 | 17ea3 | 1f8c6 |
| 1fe26 | 1fa29 | 1ee16 | 1dec6 | 17ea4 | 1f8c9 |
| 1fe29 | 1fa2c | 1ee19 | 1dec9 | 17ea5 | 1f8cc |
| 1fe2c | 1fa31 | 1ee1a | 1decc | 17ea6 | 1f8d2 |
| 1fe31 | 1fa32 | 1ee1c | 1ded2 | 17ea9 | 1f8e1 |
| 1fe32 | 1fa34 | 1ee21 | 1dee1 | 17eac | 1f8e4 |
| 1fe34 | 1fa43 | 1ee23 | 1dee4 | 17eb1 | 1f8ff |
| 1fe43 | 1fa46 | 1ee24 | 1deff | 17eb2 | 1f421 |
| 1fe46 | 1fa49 | 1ee25 | 1be12 | 17eb4 | 1f423 |
| 1fe49 | 1fa4c | 1ee26 | 1be13 | 17ec3 | 1f424 |
| 1fe4c | 1fa52 | 1ee29 | 1be16 | 17ec6 | 1f425 |
| 1fe52 | 1fa61 | 1ee2c | 1be19 | 17ec9 | 1f426 |
| 1fe61 | 1fa64 | 1ee31 | 1be1a | 17ecc | 1f429 |
| 1fe64 | 1fa86 | 1ee32 | 1be1c | 17ed2 | 1f42c |
| 1fe86 | 1fa87 | 1ee34 | 1be21 | 17ee1 | 1f431 |
| 1fe87 | 1fa89 | 1ee43 | 1be23 | 17ee4 | 1f432 |
| 1fe89 | 1fa8b | 1ee46 | 1be24 | 17eff | 1f434 |
| 1fe8b | 1fa8c | 1ee49 | 1be25 | 0fe12 | 1f449 |
| 1fe8c | 1fa8d | 1ee4c | 1be26 | 0fe13 | 1f44c |
| 1fe8d | 1fa8e | 1ee52 | 1be29 | 0fe16 | 1f461 |
| 1fe8e | 1fa92 | 1ee61 | 1be2c | 0fe19 | 1f464 |
| 1fe92 | 1fa93 | 1ee64 | 1be31 | 0fe1a | 1f486 |
| 1fe93 | 1fa96 | 1ee86 | 1be32 | 0fe1c | 1f487 |
| 1fe96 | 1fa99 | 1ee87 | 1be34 | 0fe21 | 1f489 |
| 1fe99 | 1fa9a | 1ee89 | 1be43 | 0fe23 | 1f48b |
| 1fe9a | 1fa9c | 1ee8b | 1be46 | 0fe24 | 1f48c |
| 1fe9c | 1faa1 | 1ee8c | 1be49 | 0fe25 | 1f48d |
| 1fea1 | 1faa3 | 1ee8d | 1be4c | 0fe26 | 1f48e |
| 1fea3 | 1faa4 | 1ee8e | 1be52 | 0fe29 | 1f492 |
| 1fea4 | 1faa5 | 1ee92 | 1be61 | 0fe2c | 1f493 |
| 1fea5 | 1faa6 | 1ee93 | 1be64 | 0fe31 | 1f496 |
| 1fea6 | 1faa9 | 1ee96 | 1be86 | 0fe32 | 1f499 |
| 1fea9 | 1faac | 1ee99 | 1be87 | 0fe34 | 1f49a |
| 1feac | 1fab1 | 1ee9a | 1be89 | 0fe43 | 1f49c |
| 1feb1 | 1fab2 | 1ee9c | 1be8b | 0fe46 | 1f4a1 |
| 1feb2 | 1fab4 | 1eea1 | 1be8c | 0fe49 | 1f4a3 |
| 1feb4 | 1fac3 | 1eea3 | 1be8d | 0fe4c | 1f4a4 |
| 1fec3 | 1fac6 | 1eea4 | 1be8e | 0fe52 | 1f4a5 |
| 1fec6 | 1fac9 | 1eea5 | 1be92 | 0fe61 | 1f4a6 |
| 1fec9 | 1facc | 1eea6 | 1be93 | 0fe64 | 1f4a9 |

FIG. 4B

| | | | | | |
|---|---|---|---|---|---|
| 1fecc | 1fad2 | 1eea9 | 1be96 | 0fe86 | 1f4ac |
| 1fed2 | 1fae1 | 1eeac | 1be99 | 0fe87 | 1f4b1 |
| 1fee1 | 1fae4 | 1eeb1 | 1be9a | 0fe89 | 1f4b2 |
| 1fee4 | 1faff | 1eeb2 | 1be9c | 0fe8b | 1f4b4 |
| 1fc21 | 1f612 | 1eeb4 | 1bea1 | 0fe8c | 1f4c3 |
| 1fc23 | 1f613 | 1eec3 | 1bea3 | 0fe8d | 1f4c6 |
| 1fc24 | 1f616 | 1eec6 | 1bea4 | 0fe8e | 1f4c9 |
| 1fc25 | 1f619 | 1eec9 | 1bea5 | 0fe92 | 1f4cc |
| 1fc26 | 1f61a | 1eecc | 1bea6 | 0fe93 | 1f4d2 |
| 1fc29 | 1f61c | 1eed2 | 1bea9 | 0fe96 | 1f4e1 |
| 1fc2c | 1f621 | 1eee1 | 1beac | 0fe99 | 1f4e4 |
| 1fc31 | 1f623 | 1eee4 | 1beb1 | 0fe9a | 1f4ff |
| 1fc32 | 1f624 | 1eeff | 1beb2 | 0fe9c | 1ec21 |
| 1fc34 | 1f625 | 1de12 | 1beb4 | 0fea1 | 1ec23 |
| 1fc49 | 1f626 | 1de13 | 1bec3 | 0fea3 | 1ec24 |
| 1fc4c | 1f629 | 1de16 | 1bec6 | 0fea4 | 1ec25 |
| 1fc61 | 1f62c | 1de19 | 1bec9 | 0fea5 | 1ec26 |
| 1fc64 | 1f631 | 1de1a | 1becc | 0fea6 | 1ec29 |
| 1fc86 | 1f632 | 1de1c | 1bed2 | 0fea9 | 1ec2c |
| 1fc87 | 1f634 | 1de21 | 1bee1 | 0feac | 1ec31 |
| 1fc89 | 1f643 | 1de23 | 1bee4 | 0feb1 | 1ec32 |
| 1fc8b | 1f646 | 1de24 | 1beff | 0feb2 | 1ec34 |
| 1fc8c | 1f649 | 1de25 | 17e12 | 0feb4 | 1ec49 |
| 1fc8d | 1f64c | 1de26 | 17e13 | 0fec3 | 1ec4c |
| 1fc8e | 1f652 | 1de29 | 17e16 | 0fec6 | 1ec61 |
| 1fc92 | 1f661 | 1de2c | 17e19 | 0fec9 | 1ec64 |
| 1fc93 | 1f664 | 1de31 | 17e1a | 0fecc | 1ec86 |
| 1fc96 | 1f686 | 1de32 | 17e1c | 0fed2 | 1ec87 |
| 1fc99 | 1f687 | 1de34 | 17e21 | 0fee1 | 1ec89 |
| 1fc9a | 1f689 | 1de43 | 17e23 | 0fee4 | 1ec8b |
| 1fc9c | 1f68b | 1de46 | 17e24 | 0feff | 1ec8c |
| 1fca1 | 1f68c | 1de49 | 17e25 | 1f849 | 1ec8d |
| 1fca3 | 1f68d | 1de4c | 17e26 | 1f84c | 1ec8e |
| 1fca4 | 1f68e | 1de52 | 17e29 | 1f861 | 1ec92 |
| 1fca5 | 1f692 | 1de61 | 17e2c | 1f864 | 1ec93 |
| 1fca6 | 1f693 | 1de64 | 17e31 | 1f886 | 1ec96 |
| 1fca9 | 1f696 | 1de86 | 17e32 | 1f887 | 1ec99 |
| 1fcac | 1f699 | 1de87 | 17e34 | 1f889 | 1ec9a |
| 1fcb1 | 1f69a | 1de89 | 17e43 | 1f88b | 1ec9c |
| 1fcb2 | 1f69c | 1de8b | 17e46 | 1f88c | 1eca1 |
| 1fcb4 | 1f6a1 | 1de8c | 17e49 | 1f88d | 1eca3 |
| 1fcc3 | 1f6a3 | 1de8d | 17e4c | 1f88e | 1eca4 |
| 1fcc6 | 1f6a4 | 1de8e | 17e52 | 1f892 | 1eca5 |
| 1fcc9 | 1f6a5 | 1de92 | 17e61 | 1f893 | 1eca6 |
| 1fccc | 1f6a6 | 1de93 | 17e64 | 1f896 | 1eca9 |
| 1fcd2 | 1f6a9 | 1de96 | 17e86 | 1f899 | 1ecac |
| 1fce1 | 1f6ac | 1de99 | 17e87 | 1f89a | 1ecb1 |
| 1fce4 | 1f6b1 | 1de9a | 17e89 | 1f89c | 1ecb2 |
| 1fcff | 1f6b2 | 1de9c | 17e8b | 1f8a1 | 1ecb4 |

FIG. 4C

| | | | | | |
|---|---|---|---|---|---|
| 1ecc6 | 17c24 | 1f229 | 1da26 | 17a13 | 0fac3 |
| 1ecc9 | 17c25 | 1f22c | 1da29 | 17a16 | 0fac6 |
| 1eccc | 17c26 | 1f231 | 1da2c | 17a19 | 0fac9 |
| 1ecd2 | 17c29 | 1f232 | 1da31 | 17a1a | 0facc |
| 1ece1 | 17c2c | 1f234 | 1da32 | 17a1c | 0fad2 |
| 1ece4 | 17c31 | 1f243 | 1da34 | 17a21 | 0fae1 |
| 1ecff | 17c32 | 1f246 | 1da43 | 17a23 | 0fae4 |
| 1dc21 | 17c34 | 1f249 | 1da46 | 17a24 | 0faff |
| 1dc23 | 17c49 | 1f24c | 1da49 | 17a25 | 1e612 |
| 1dc24 | 17c4c | 1f252 | 1da4c | 17a26 | 1e613 |
| 1dc25 | 17c61 | 1f261 | 1da52 | 17a29 | 1e616 |
| 1dc26 | 17c64 | 1f264 | 1da61 | 17a2c | 1e619 |
| 1dc29 | 17c86 | 1f286 | 1da64 | 17a31 | 1e61a |
| 1dc2c | 17c87 | 1f287 | 1da86 | 17a32 | 1e61c |
| 1dc31 | 17c89 | 1f289 | 1da87 | 17a34 | 1e621 |
| 1dc32 | 17c8b | 1f28b | 1da89 | 17a43 | 1e623 |
| 1dc34 | 17c8c | 1f28c | 1da8b | 17a46 | 1e624 |
| 1dc49 | 17c8d | 1f28d | 1da8c | 17a49 | 1e625 |
| 1dc4c | 17c8e | 1f28e | 1da8d | 17a4c | 1e626 |
| 1dc61 | 17c92 | 1f292 | 1da8e | 17a52 | 1e629 |
| 1dc64 | 17c93 | 1f293 | 1da92 | 17a61 | 1e62c |
| 1dc86 | 17c96 | 1f296 | 1da93 | 17a64 | 1e631 |
| 1dc87 | 17c99 | 1f299 | 1da96 | 17a86 | 1e632 |
| 1dc89 | 17c9a | 1f29a | 1da99 | 17a87 | 1e634 |
| 1dc8b | 17c9c | 1f29c | 1da9a | 17a89 | 1e643 |
| 1dc8c | 17ca1 | 1f2a1 | 1da9c | 17a8b | 1e646 |
| 1dc8d | 17ca3 | 1f2a3 | 1daa1 | 17a8c | 1e649 |
| 1dc8e | 17ca4 | 1f2a4 | 1daa3 | 17a8d | 1e64c |
| 1dc92 | 17ca5 | 1f2a5 | 1daa4 | 17a8e | 1e652 |
| 1dc93 | 17ca6 | 1f2a6 | 1daa5 | 17a92 | 1e661 |
| 1dc96 | 17ca9 | 1f2a9 | 1daa6 | 17a93 | 1e664 |
| 1dc99 | 17cac | 1f2ac | 1daa9 | 17a96 | 1e686 |
| 1dc9a | 17cb1 | 1f2b1 | 1daac | 17a99 | 1e687 |
| 1dc9c | 17cb2 | 1f2b2 | 1dab1 | 17a9a | 1e689 |
| 1dca1 | 17cb4 | 1f2b4 | 1dab2 | 17a9c | 1e68b |
| 1dca3 | 17cc3 | 1f2c3 | 1dab4 | 17aa1 | 1e68c |
| 1dca4 | 17cc6 | 1f2c6 | 1dac3 | 17aa3 | 1e68d |
| 1dca5 | 17cc9 | 1f2c9 | 1dac6 | 17aa4 | 1e68e |
| 1dca6 | 17ccc | 1f2cc | 1dac9 | 17aa5 | 1e692 |
| 1dca9 | 17cd2 | 1f2d2 | 1dacc | 17aa6 | 1e693 |
| 1dcac | 17ce1 | 1f2e1 | 1dad2 | 17aa9 | 1e696 |
| 1dcb1 | 17ce4 | 1f2e4 | 1dae1 | 17aac | 1e699 |
| 1dcb2 | 17cff | 1f2ff | 1dae4 | 17ab1 | 1e69a |
| 1dcb4 | 0fc21 | 1ea12 | 1daff | 17ab2 | 1e69c |
| 1dcc3 | 0fc23 | 1ea13 | 1ea12 | 17ab4 | 1e6a1 |
| 1dcc6 | 0fc24 | 1ea16 | 1ea13 | 17ac3 | 1e6a3 |
| 1dcc9 | 0fc25 | 1ea19 | 1ea16 | 17ac6 | 1e6a4 |
| 1dccc | 0fc26 | 1ea1a | 1ea19 | 17ac9 | 1e6a5 |
| 1dcd2 | 0fc29 | 1ea1c | 1ea1a | 17acc | 1e6a6 |

FIG. 4D

| | | | | | |
|---|---|---|---|---|---|
| 1dce1 | 0fc2c | 1ea24 | 1ba1c | 17ad2 | 1e6a9 |
| 1dce4 | 0fc31 | 1ea25 | 1ba21 | 17ae1 | 1e6ac |
| 1dcff | 0fc32 | 1ea26 | 1ba23 | 17ae4 | 1e6b1 |
| 1bc21 | 0fc34 | 1ea2c | 1ba24 | 17aff | 1e6b2 |
| 1bc23 | 0fc49 | 1ea31 | 1ba25 | 0fa12 | 1e6b4 |
| 1bc24 | 0fc4c | 1ea32 | 1ba26 | 0fa13 | 1e6c3 |
| 1bc25 | 0fc61 | 1ea34 | 1ba29 | 0fa16 | 1e6c6 |
| 1bc26 | 0fc64 | 1ea43 | 1ba2c | 0fa19 | 1e6c9 |
| 1bc29 | 0fc86 | 1ea46 | 1ba31 | 0fa1a | 1e6cc |
| 1bc2c | 0fc87 | 1ea49 | 1ba32 | 0fa1c | 1e6d2 |
| 1bc31 | 0fc89 | 1ea4c | 1ba34 | 0fa21 | 1e6e1 |
| 1bc32 | 0fc8b | 1ea52 | 1ba43 | 0fa23 | 1e6e4 |
| 1bc34 | 0fc8c | 1ea61 | 1ba46 | 0fa24 | 1e6ff |
| 1bc49 | 0fc8d | 1ea64 | 1ba49 | 0fa25 | 1d612 |
| 1bc4c | 0fc8e | 1ea86 | 1ba4c | 0fa26 | 1d613 |
| 1bc61 | 0fc92 | 1ea87 | 1ba52 | 0fa29 | 1d616 |
| 1bc64 | 0fc93 | 1ea8c | 1ba61 | 0fa2c | 1d619 |
| 1bc86 | 0fc96 | 1ea8d | 1ba64 | 0fa31 | 1d61a |
| 1bc87 | 0fc99 | 1ea8e | 1ba86 | 0fa32 | 1d61c |
| 1bc89 | 0fc9a | 1ea92 | 1ba87 | 0fa33 | 1d621 |
| 1bc8b | 0fc9c | 1ea93 | 1ba89 | 0fa43 | 1d623 |
| 1bc8c | 0fca1 | 1ea96 | 1ba8b | 0fa46 | 1d624 |
| 1bc8d | 0fca3 | 1ea99 | 1ba8c | 0fa49 | 1d625 |
| 1bc8e | 0fca4 | 1ea9a | 1ba8d | 0fa4c | 1d626 |
| 1bc92 | 0fca5 | 1ea9c | 1ba8e | 0fa52 | 1d629 |
| 1bc93 | 0fca6 | 1eaa4 | 1ba92 | 0fa61 | 1d62c |
| 1bc96 | 0fca9 | 1eaa5 | 1ba93 | 0fa64 | 1d631 |
| 1bc99 | 0fcac | 1eaa6 | 1ba96 | 0fa86 | 1d632 |
| 1bc9a | 0fcb1 | 1eaac | 1ba99 | 0fa87 | 1d634 |
| 1bc9c | 0fcb2 | 1eab1 | 1ba9a | 0fa89 | 1d643 |
| 1bca1 | 0fcb4 | 1eab2 | 1ba9c | 0fa8b | 1d646 |
| 1bca3 | 0fcc3 | 1eab4 | 1baa1 | 0fa8c | 1d649 |
| 1bca4 | 0fcc6 | 1eac3 | 1baa3 | 0fa8d | 1d64c |
| 1bca5 | 0fcc9 | 1eac6 | 1baa4 | 0fa8e | 1d652 |
| 1bca6 | 0fccc | 1eac9 | 1baa5 | 0fa92 | 1d661 |
| 1bca9 | 0fcd2 | 1eacc | 1baa6 | 0fa93 | 1d664 |
| 1bcac | 0fce1 | 1ead2 | 1baa9 | 0fa96 | 1d686 |
| 1bcb1 | 0fce4 | 1eae1 | 1baac | 0fa99 | 1d687 |
| 1bcb2 | 0fcff | 1eae4 | 1bab1 | 0fa9a | 1d689 |
| 1bcb4 | 1f212 | 1eaff | 1bab2 | 0fa9c | 1d68b |
| 1bcc3 | 1f213 | 1da12 | 1bab4 | 0faa1 | 1d68c |
| 1bcc6 | 1f216 | 1da13 | 1bac3 | 0faa3 | 1d68d |
| 1bcc9 | 1f219 | 1da16 | 1bac6 | 0faa4 | 1d68e |
| 1bccc | 1f21a | 1da19 | 1bac9 | 0faa5 | 1d692 |
| 1bcb2 | 1f21c | 1da1a | 1bacc | 0faa6 | 1d693 |
| 1bce1 | 1f221 | 1da1c | 1bad2 | 0faa9 | 1d696 |
| 1bce4 | 1f223 | 1da21 | 1bae1 | 0faac | 1d699 |
| 1bcff | 1f224 | 1da23 | 1bae4 | 0fab1 | 1d69a |
| 17c21 | 1f225 | 1da24 | 1baff | 0fab2 | 1d69c |

RLL CODE GENERATION METHOD FOR DATA STORAGE DEVICE AND RECODING METHOD THEREFOR

BACKGROUND OF THE INVENTION

The present invention relates to a run length limited (RLL) coding method used for digital data magnetic recording. More particularly, it relates to an RLL code generation method providing higher recording density than a conventional rate 8/9(0,4/4) coding method and decoding method therefor.

Currently, research and development for effectively utilizing massive amounts of information have been conducted as the amount of data increases, particularly, in the field related to data storage devices. The end of the effort in the data storing field has been concentrated in the rapid transfer of massive amounts of information with high recording density and high reliability. To this end, a method for improving the physical properties of a data storage disk or improving the precision of an storage device is considered. Also, as an aspect of signal processing, there are provided a method for increasing the recording density of the storage device through effective coding, a method for reducing a data detection error using a signal processing technology, etc.

Generally, data to be written in a data storage device is encoded into a RLL code. RLL code is a code that limits continuous-repetition of a specific bit pattern for timing control of a sampling clock and proper signal detection, that is, the number of successive "0"s between "1" and "1" is limited to the minimum d and the maximum k.

As recently used among coding methods using the RLL code there are rate 1/2(2,7) modulation code, rate 2/3(1,7) modulation code, rate 8/9(0,3) modulation code, rate 8/9(0, 4/4) modulation code, etc.

According to the rate 1/2(2,7) modulation code and rate 2/3(1,7) modulation code, "d" is equal to 1 and 2, respectively. Accordingly, interference between signals is decreased while redundancy is high due to the low code rate. Also, since the value of "k" is comparatively greater than those of the rate 8/9(0,3) and rate 8/9(0,4/4) modulation codes, it has less timing information which is helpful in the operation of a phase locked loop (PLL).

The rate 8/9(0,3) coding and rate 8/9(0,4/4) coding methods provide high recording density due to less redundancy thereof, and include much timing information due to the small "k" thereof. However, interference between signals increases since "d" is equal to "0".

Partial response maximum likelihood (PRML) pre-codes input signal to provide controlled inter-symbol interference (ISI) between the current data and the previous data, and then modifies into a target response $d_k=a_k+a_{k-1}$ or $d_k=a_k-a_{k-2}$, and data is detected using a Viterbi decoder. The PRML method shows excellent detecting capacity in a channel having n=1.

RLL codes with "d" greater than zero are not necessary in PRML channels. Since the compensation for the ISI is inherent in the maximum likelihood (ML) detector, there is no need to reduce the interference by coding with a d condition.

Thus, the rate 8/9(0,3) coding and rate 8/9(0,4/4) coding methods are employed in the PRML method utilizing the interference between signals to improve performance with holding high recording density and more timing information.

Also, since the rate 8/9(0,3) coding and the rate 8/9(0,4/4) coding methods have a high code rate, they provide good effect to an equalizer with respect to a given partial response class compared to the rate 1/2(2,7) coding or rate 2/3(1,7) coding method.

If the data sequence of an input signal is divided into an even-bit subsequence and an odd-bit subsequence, ML detection is independently applied to each subsequence. A constraint on the number of successive nominally zero samples in each subsequence adequately limits the detector delay and limits the hardware size. The maximum number of continuous "0"s between "1"s required for each subsequence is called "k1". The condition of k1 required for each subsequence is to reduce a path memory for the ML detector. The RLL(0,k/k1) modulation code satisfying the above condition is the rate 8/9(0,4/4) modulation code.

SUMMARY OF THE INVENTION

It is an object of the present invention to provide a partial response maximum likelihood (PRML) for a data storage device, providing a much higher recording density than a conventional rate 8/9(0,4/4) coding method.

To achieve the above object, there is provided a run length limited (RLL) code generating method for generating a predetermined number of bit codewords comprising the steps of: (a) receiving sequences of 16-bit data; and (b) producing sequences of 17-bit codewords, wherein the sequences of 17-bit codewords have a first predetermined number of successive zeros as a maximum run length of zeros, and the sequences of 17-bit codewords include two subsequences each having a second predetermined number of successive zeros as a maximum run length of zeros.

BRIEF DESCRIPTION OF THE DRAWINGS

The above object and advantages of the present invention will become more apparent by describing in detail a preferred embodiment thereof with reference to the attached drawings in which:

FIG. 4 is an excerpt of a table showing 17-bit codewords in hexadecimal form with respect to input 16-bit sequences 0000-FFFF.

DETAILED DESCRIPTION OF THE INVENTION

Figure 1:
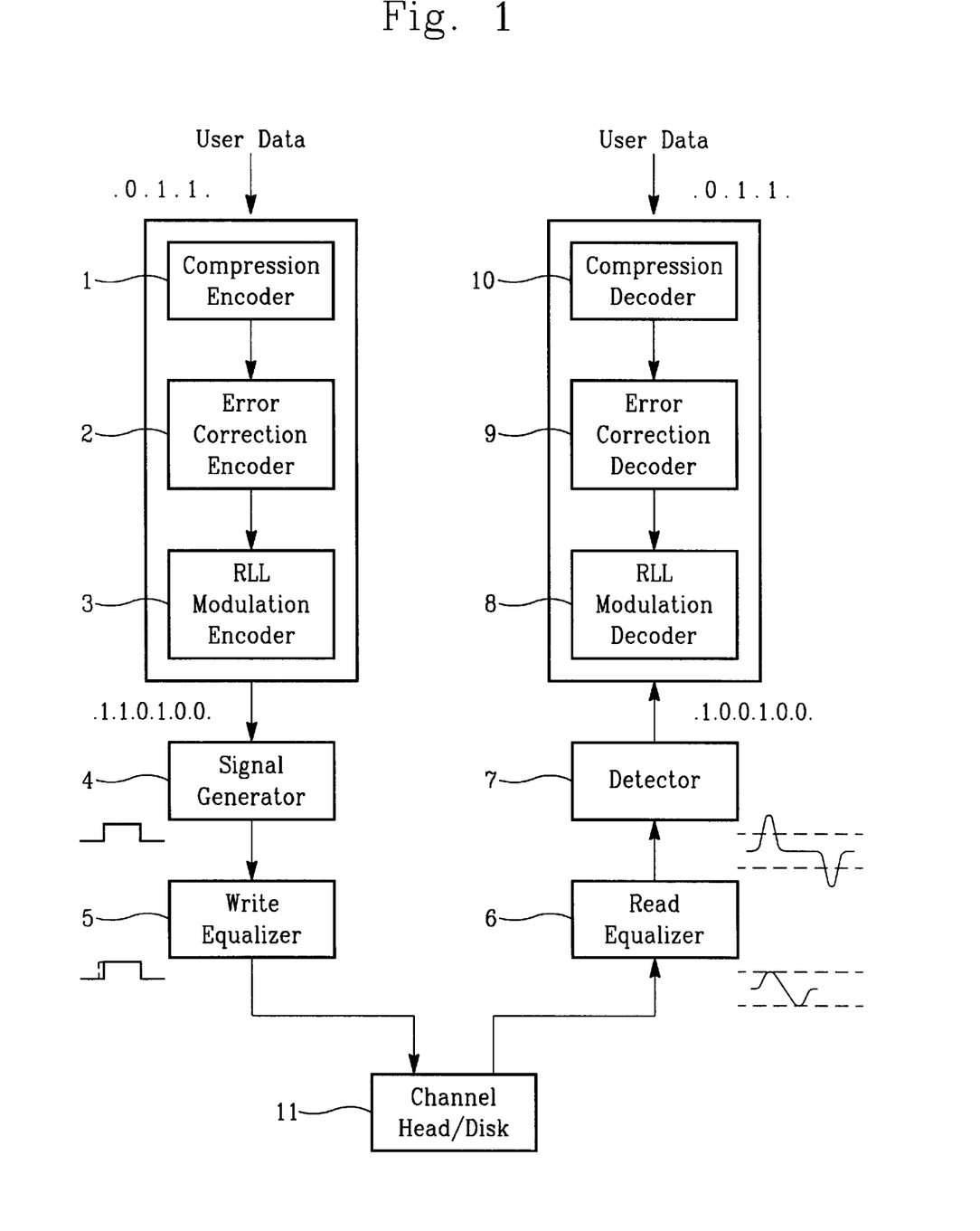
FIG. 1 is a block diagram showing the structure of a digital data storage device adopting a run length limited (RLL) code generation method according to the present invention.

In a digital data storage device shown for example in FIG. 1, a user data to be recorded comes to have protection against noises or other factors causing various kinds of signal distortion via a compression encoder 1 and an error correction encoder 2. Then the signal is coded by a run length limited (RLL) modulation encoder 3 which is suitable for a channel characteristic of the storing apparatus, and then written via a signal generator 4 and a write equalizer 5 for example through a channel head/disk 11. During a reproducing process, a signal (here, from the channel head/disk 11) is detected via a read equalizer 6 and a detector 7 to minimize an error probability, and then restored into the initial user data via an RLL modulation decoder 8, an error correction decoder 9 and a compression decoder 10 corresponding to the modulation encoder 3, the error correction encoder 2 and the compression encoder 1, respectively.

Figure 2:
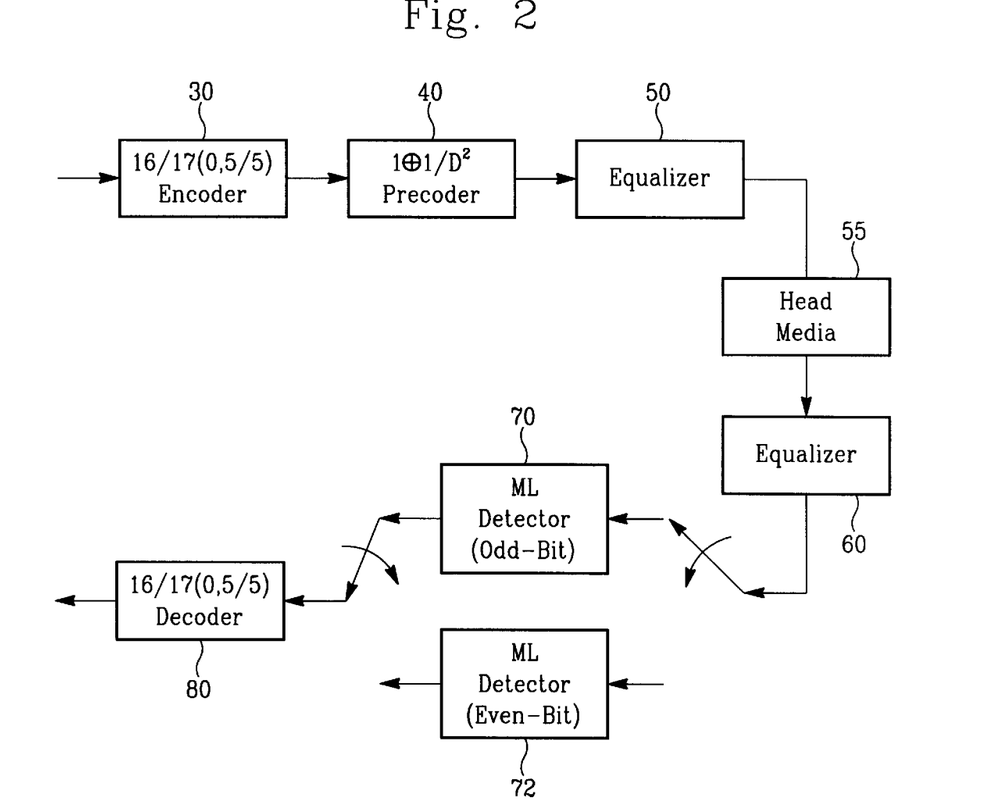
FIG. 2 is a detailed block diagram of a system using a 16/17 RLL (0,5/5) modulation code in FIG. 1.

FIG. 2 is a detailed block diagram of an encoding/decoding system using a 16/17 RLL (0,5/5) modulation code in FIG. 1. In the system shown in FIG. 2, an input signal is coded by an RLL 16/17(0,5/5) encoder 30 and then written in a storage device (for example, through head media 55) via a precoder 40 and equalizer 50. Then, the signal (for example, from head media 55) is processed by equalizers 60 for easy detection of the signal, and is then reproduced via ML detectors 70 and 72, each for the odd- and even-number subsequences, and an RLL 16/17(0,5/5) decoder 80 corresponding to the RLL 16/17(0,5/5) encoder 30.

This system can transfer the signal at a higher rate at a given bandwidth compared with a full response signal, and provides much timing information to a phase locked loop (PLL) for timing recovery. Also, the signal can be reliably detected using the ML detectors (Viterbi detectors) 70 and 72 having a simple structure.

A modulation code of the present invention is expressed by three parameters d, k, k1. The parameters d and k represent the minimum run length and the maximum run length of zeros included in each sequence to be output, respectively, and the parameter k1 represents the maximum run length of zeroes included in an even-bit or odd-bit subsequence. In the code of the present invention, the d constraint is "0". The small k is required for precision in the timing and gain control, and k1 reduces the size of a path memory required for the ML detectors.

The value of parameters k and k1 according to the present invention is 5, respectively. The present invention provides look-up tables for the coding and decoding of the rate 16/17 block code having these parameters.

Figure 3:
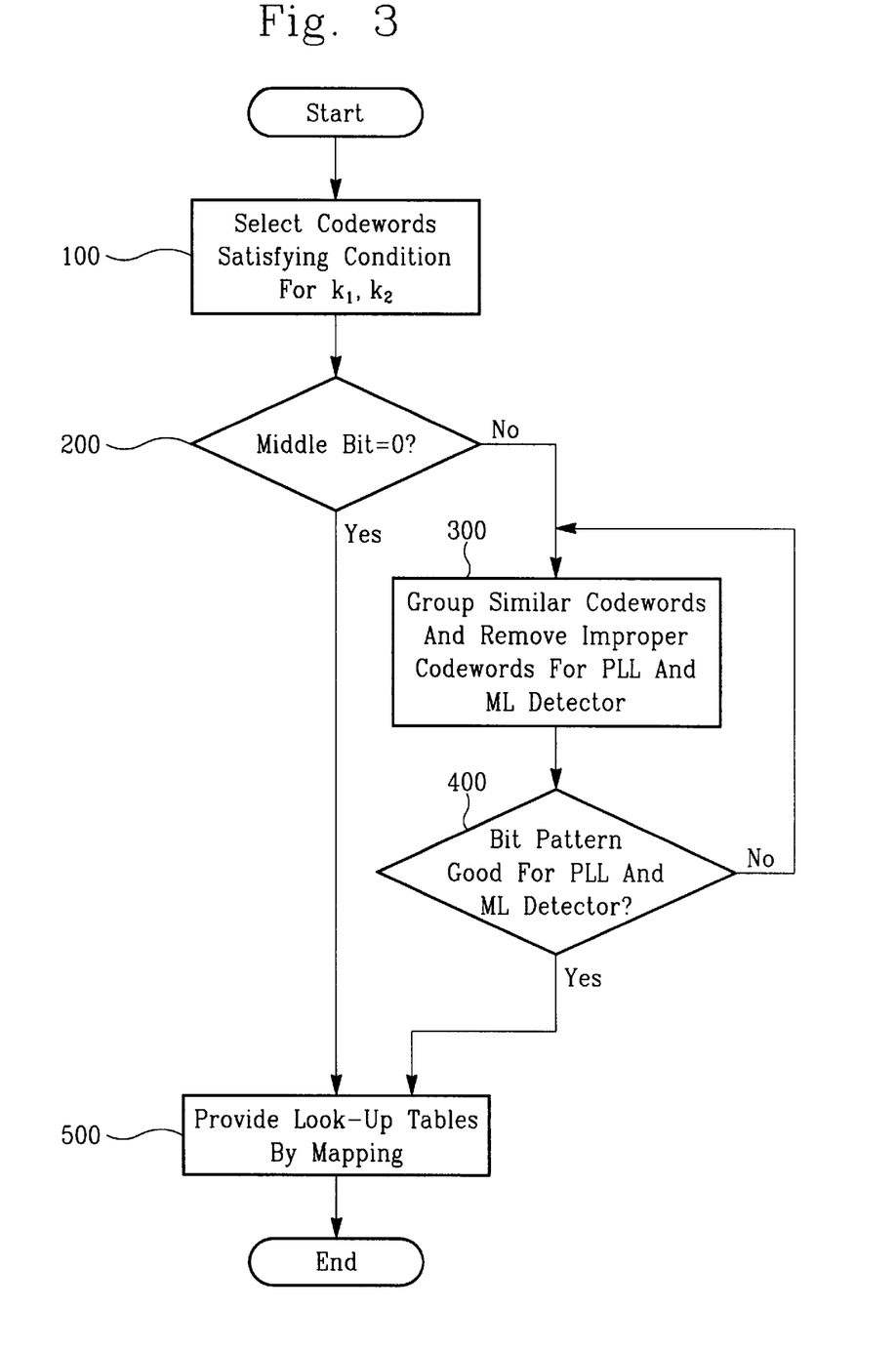
FIG. 3 is a flowchart illustrating a RLL code generation method according to the present invention.

FIG. 3 is a flowchart illustrating an RLL code generation method according to the present invention. The operational principle thereof will now be described. The rate 16/17 RLL block code having the constraint parameters k and k1 of (0,5/5) provides 72750 codewords corresponding to 17-bit codewords, one-to-one from 16-bit data byte. Thus, all data combinations of 16-bit can be encoded into 17-bit codewords and decoded therefrom.

According to the present invention, the codewords come to have a similar structure to that of the 16-bit data through 2 bytes partition. The 2 bytes partition is for simplifying a one-to-one correspondence between 16-bit binary data and the codewords.

Assuming that Y represents 17-bit codewords of the rate 16/17(0,k/k1) RLL block code, Y is expressed by the following formula (1).

$$Y = \{Y_1, Y_2, Y_3, Y_4, Y_5, Y_6, Y_7, Y_8, Y_9, Y_{10}, Y_{11}, Y_{12}, Y_{13}, Y_{14}, Y_{15}, Y_{16}, Y_{17}\} \quad (1)$$

In step 100 of FIG. 3, the sequences of codeword satisfying the constraint k=5 can be achieved by removing sequences having three or more continuous zeros run length at the one other end and two or more continuous zeros run length at the other end and sequences having five or more run length. The constraint is given from the boolean relationship of the following formula (2).

$$(Y_1 + Y_2 + Y_3 + Y_4)(Y_2 + Y_3 + Y_4 + Y_5 + Y_6 + Y_7)$$

$$(Y_3 + Y_4 + Y_5 + Y_6 + Y_7 + Y_8)(Y_4 + Y_5 + Y_6 + Y_7 + Y_8 + Y_9)$$

$$(Y_5 + Y_6 + Y_7 + Y_8 + Y_9 + Y_{10})(Y_6 + Y_7 + Y_8 + Y_9 + Y_{10} + Y_{11})$$

$$(Y_7 + Y_8 + Y_9 + Y_{10} + Y_{11} + Y_{12})(Y_8 + Y_9 + Y_{10} + Y_{11} + Y_{12} + Y_{13})$$

$$(Y_9 + Y_{10} + Y_{11} + Y_{12} + Y_{13} + Y_{14})$$

$$(Y_{10} + Y_{11} + Y_{12} + Y_{13} + Y_{14} + Y_{15})$$

$$(Y_{11} + Y_{12} + Y_{13} + Y_{14} + Y_{15} + Y_{16} + Y_{17}) = 1$$

Similarly, the sequences of codeword satisfying the constraint k1=5 can be achieved by removing sequences having three or more continuous zeros run length at the one end and two or more continuous zeros run length at the other end and sequences having five or more zeros run length in respect to even-bit or odd-bit subsequence within 17-bit codeword sequences satisfying the constraint k=5.

The constraint is given from the boolean relationship of the following formulas (3) and (4).

$$(Y_1+Y_3+Y_5+Y_7)(Y_3+Y_5+Y_7+Y_9+Y_{11}+Y_{13})(Y_5+Y_7+Y_9+Y_{11}+Y_{13}+Y_{15}) (Y_7+Y_9+Y_{11}+Y_{13}+Y_{15}+Y_{17})=1 \quad (3)$$

$$(Y_2+Y_4+Y_6+Y_8)(Y_4+Y_6+Y_8+Y_{10}+Y_{12}+Y_{14})(Y_8+Y_{10}+Y_{12}+Y_{14})(Y_{12}+Y_{14}+Y_{16})=1 \quad (4)$$

72750 sequences meet the above formulas (2), (3) and (4). Thus, 7214 (72750–65536) redundant codewords are used for removing an undesired codeword pattern or for another special purpose.

In step 200, a method of partition is adopted for providing regularity to the relationship between the 17-bit codewords and the 16-bit data.

First, sequences of 16-bit data are mapped with sequences of 17-bit codeword having the same bit pattern.

That is, sequences of codeword having "1" as the middle bit among the sequences of 17-bit codeword satisfying the formulas (2), (3) and (4) are mapped with sequences of 16-bit data having the same forward and backward 8 bits. The number of pairs mapped by the partition of 16-bit data sequences and the 17-bit codewords are 37849. However, in order to prevent the coded sequence from having all "1"s, the middle bit of the codeword having all "1"s is set to "0".

In step 300, the remaining sequences of 16-bit data excluded in the step 200 are mapped with the sequences of 17-bit codeword.

Among 27687 17-bit codewords having 0s as middle bits, codewords having the same forward 8 bits $[Y_1, Y_2, Y_3, Y_4, Y_5, Y_6, Y_7, Y_8]$ are grouped and codewords having fewer zeros are preferably selected. Here, in step 400, codewords which have detrimental effects on the PLL and the ML detector can be removed to maintain timing information and reduce the detrimental effects on the ML detectors. Also, the complexity of the encoder/decoder can be reduced.

FIG. 4 shows a portion of a table of 17-bit codewords in a hexadecimal form with respect to input 16-bit sequences 0000-FFFF.

As described above, according to the present invention, a modulation code which is suitable for a PR channel, expressed as (1−D) (1+D)$^n$, where n=1, 2, . . . , using ML detectors, is provided. The modulation code provides abundant non-zero samples, improving the channel timing and the capability of the gain control circuit.

Also, the path of the Viterbi decoder is forcibly merged, so that a path memory is decreased and the complexity of the ML detector is also limited.

Also, in order to write more data on a disk, further small redundancy is provided, and a signal can easily be detected while maintaining a self-clocking of the signal. Also, the size of the path memory required for the ML detector is reduced, thereby reducing delay in detection and the complexity of the hardware. Also, according to the present invention, the optimized look-up tables for input and output with respect to the coding and decoding of the rate 16/17 (0,5/5) block code, and a simplified relationship between the input and output are provided. Particularly, in the digital data magnetic recording for a disk memory device, the signal can be transmitted at a high rate with higher density, compared to that of the conventional rate 8/9(0,4/4) coding method.

What is claimed is:

1. A run length limited (RLL) code generating method for generating a predetermined number of bit codewords for use in digital data recording, comprising the steps of:

(a) receiving sequences of 16-bit data; and
   (b) producing sequences of 17-bit codewords based on the received sequences of 16-bit data;
   wherein each 17-bit codeword of the sequences of 17-bit codewords has a first predetermined number of successive zeros as a maximum run length of zeros, and each 17-bit codeword of the sequences of 17-bit codewords includes two subsequences each having a second predetermined number of successive zeros as a maximum run length of zeros.

2. A run length limited (RLL) code generating method as claimed in claim 1, wherein the first predetermined number of successive zeros and the second predetermined number of successive zeros are equal to each other.

3. A run length limited (RLL) code generating method as claimed in claim 1, wherein the first predetermined number of successive zeros and the second predetermined number of successive zeros are both 5.

4. A run length limited (RLL) code generating device for generating a predetermined number of bit codewords for use in digital data recording, comprising:

receiving means for receiving sequences of 16-bit data; and
   producing means for producing sequences of 17-bit codewords based on the received sequences of 16-bit data;
   wherein, each 17-bit codeword of the sequences of 17-bit codewords has a first predetermined number of successive zeros as a maximum run length of zeros, and each 17-bit codeword of the sequences of 17-bit codewords includes two subsequences each having a second predetermined number of successive zeros as a maximum run length of zeros.

5. A run length limited (RLL) code generating method for generating a predetermined number of bit codewords for use in digital data recording, comprising the steps of:

receiving data sequences; and
   producing codeword sequences from the received data sequences;
   wherein the producing step uses a look-up table provided by steps including:

(a) selecting codeword sequences satisfying the condition where the number of successive zeros is less than a first predetermined number among the codeword sequences;
   (b) selecting codeword sequences from the codeword sequences selected in the step (a), including odd-number bit subsequences or even-number bit subsequences satisfying the condition where the number of continuous zeros is less than a second predetermined number; and
   (c) comparing a middle bit of the codewords selected in the step (b) with 1, and performing the step (d) if the middle bit is 1, and performing the steps (e) and (f) if the middle bit is not 1;
   (d) mapping the codeword sequences into data sequences;
   (e) grouping similar codeword sequences and selecting proper codeword sequences; and
   (f) mapping the codeword sequences selected in the step (e).

* * * * *